United States Patent
Hehenberger

(10) Patent No.: US 6,428,274 B1
(45) Date of Patent: Aug. 6, 2002

(54) DRIVE MECHANISM FOR ADJUSTING THE ROTOR BLADES OF WIND POWER INSTALLATIONS

(75) Inventor: Gerald Hehenberger, Klagenfurt (AT)

(73) Assignee: Windtec Anlagenerrichtungs-und Consulting GmbH, Volkermarkt (AU)

( * ) Notice: Subject to any disclaimer, the term of this patent is extended or adjusted under 35 U.S.C. 154(b) by 0 days.

(21) Appl. No.: 09/530,751
(22) PCT Filed: Nov. 3, 1998
(86) PCT No.: PCT/AT98/00268
§ 371 (c)(1), (2), (4) Date: May 4, 2000
(87) PCT Pub. No.: WO99/23384
PCT Pub. Date: May 14, 1999

(30) Foreign Application Priority Data

Nov. 4, 1997 (AT) .............................. 1860/97

(51) Int. Cl.[7] .................................. F03B 3/14
(52) U.S. Cl. ................. 416/153; 416/155; 416/162; 416/169 R
(58) Field of Search ................ 416/153, 155, 416/159, 162, 169 R; 290/44, 55

(56) References Cited

U.S. PATENT DOCUMENTS

| 2,280,374 A | * | 4/1942 | Chilton | 416/151 |
|---|---|---|---|---|
| 3,187,819 A | * | 6/1965 | Barnes et al. | 416/513 |
| 4,366,386 A | | 12/1982 | Hanson | |
| 4,462,753 A | * | 7/1984 | Harner et al. | 416/48 |
| 4,483,657 A | | 11/1984 | Kaiser | |
| 4,649,284 A | | 3/1987 | Hsech-Pen | |
| 4,653,982 A | | 3/1987 | Kojima et al. | |
| 4,701,104 A | | 10/1987 | Cohen | |
| 4,757,211 A | | 7/1988 | Kristensen | |
| 5,452,988 A | | 9/1995 | Short et al. | |
| 5,907,192 A | * | 5/1999 | Lyons et al. | 290/44 |

FOREIGN PATENT DOCUMENTS

| DE | 743 890 | 5/1943 |
|---|---|---|
| DE | 31 50 715 | 6/1983 |
| DE | 34 13 191 | 10/1985 |
| DE | 42 32 516 | 3/1993 |
| DE | 42 21 783 | 1/1994 |
| DE | 196 34 059 | 10/1997 |
| FR | 2 432 626 | 2/1980 |
| FR | 2 566 466 | 12/1985 |
| FR | 2 574 490 | 6/1986 |
| GB | 2 263 886 | 8/1993 |
| WO | WO 84/00053 | 1/1984 |
| WO | WO 84/03739 | 9/1984 |

* cited by examiner

Primary Examiner—Edward K. Look
Assistant Examiner—Ninh Nguyen
(74) Attorney, Agent, or Firm—Young & Thompson

(57) ABSTRACT

A device for adjustment of rotor blades which are pivotally mounted on a rotor hub of a wind power plant, with a drive for turning the rotor blades and a lockout which is connected to each rotor blade, the lockout being an activatable lockout which in the activated state prevents turning of the rotor blades into the operating position, but allows turning of the rotor blades into the feathered position.

21 Claims, 3 Drawing Sheets

DRIVE MECHANISM FOR ADJUSTING THE ROTOR BLADES OF WIND POWER INSTALLATIONS

BACKGROUND OF THE INVENTION

Figure 1:
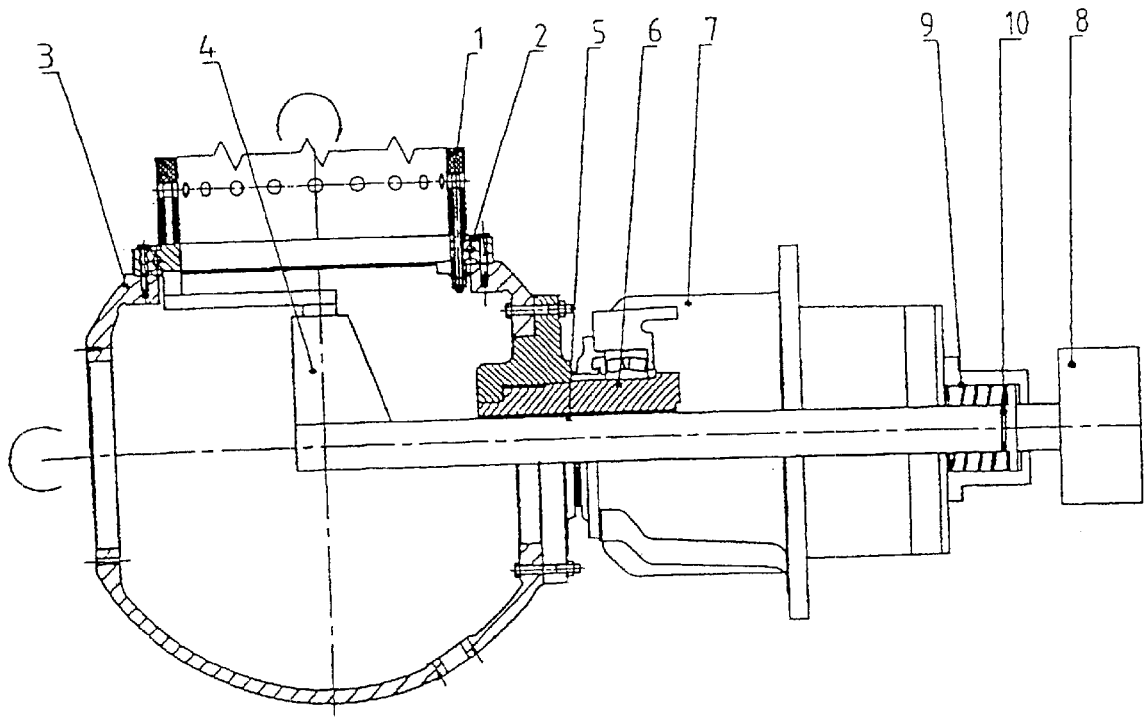

Device for adjustment of rotor blades which are pivotally mounted on the rotor hub of a wind power plant, with a drive for turning the rotor blades and with a lockout which is connected to the rotor blades.

DESCRIPTION OF THE RELATED ART

Wind power plants are plants which are exposed to high stresses. One method of reducing the forces acting on the plant is to use rotor blade adjustment. In addition to the effect of reducing the load, rotor blade adjustment can also be used as a braking system by turning the rotor blades in the direction of the feathered position to shut down the wind power plant and thus the plant loses power and rpm.

Basically the rotor blades, if they are not stopped, have the tendency to turn due to inertial forces and forces of gravity (the center of gravity of the rotor blades is outside their axis of rotation) and external wind forces. The wind forces cause turning of the rotor blades in the direction of the feathered position and the inertial forces cause turning in both directions according to the respective position of the rotor blades during one rotor revolution, the inertial forces mostly predominating.

Turning of the rotor blades beyond the feathered position is conventionally limited by a mechanical stop. If therefore the rotor blades are not stopped, they execute an oscillating rotary motion around their axis of rotation over the course of one rotor revolution, by which the wind power plant cannot be stopped due to wind forces.

In plants according to the prior art which for the most part have three rotor blades, the latter are usually adjusted by a central linear drive in combination with a mechanical rod. Newer systems use mechanical/electrical and mechanical/hydraulic individual blade adjustment. In these systems each rotor blade is adjusted individually and by means of a control unit synchronism of rotor blade adjustment is accomplished. The advantage of individual blade adjustment is that when a drive unit fails the remaining drive units can still be used to turn these rotor blades into the feathered position in order to reliably shut down the plant.

To ensure braking of the plant by rotor blade adjustment even when the power supply fails, in plants of the prior art it is equipped for example with emergency battery power supply or the rotor blades are moved into the working position against a spring force or hydraulic pressure, with which reset of the rotor blades into the feathered position is ensured in any case. Equipping the rotor blade adjustment with an emergency battery power supply is associated with relatively high costs, since the batteries necessary for turning the rotor blades into the feathered position or keeping them in the feathered position until the plant stops must have a not inconsiderable power or capacity.

In the case of adjusting the rotor blades against spring force or hydraulic pressure, correspondingly complex mechanical and hydraulic devices are necessary, and rotor blade adjustment must also be designed for higher loads since the spring force or the force of hydraulics must also be overcome.

U.S. Pat. No. 4,653,982 discloses a wind power plant with a generic adjustment means for rotor blades in which the rotor blades, when reaching a certain maximum rotor rpm, supported by an electromagnet are turned into the feathered position and kept in this position until the rotor rpm again drops below a certain rpm and the rotor blades again turn automatically into the operating position.

U.S. Pat. No. 4,701,104 discloses an adjustment means with a lockout for the rotor blades of a ram-air turbine in which the lockout is kept open by an electromagnet during turbine operation. When the lockout is activated by interruption of the power supply to the electromagnet, the rotor blades are turned into the feathered position by the adjustment means and kept in this position.

U.S. Pat. No. 5,452,988 discloses a gas turbine fan with rotor blade adjustment which has an adjustment means for turning the rotor blades into the operating or feathered position and for stopping the rotor blades in the position which has been set at the time.

SUMMARY OF THE INVENTION

The object of the invention is to make available rotor blade adjustment in which turning of the rotor blades into the feathered position when the power supply fails is possible with less technical effort.

The lockout is deactivated in normal operation and when the power supply fails it is activated, by which the rotor blades can only continue to turn into the feathered position and are held there until the plant has come to a standstill.

BACKGROUND OF THE INVENTION

Other features and advantages of the invention follow from the dependent claims and the following description of embodiments of the invention with reference to the drawings.

Figure 2:
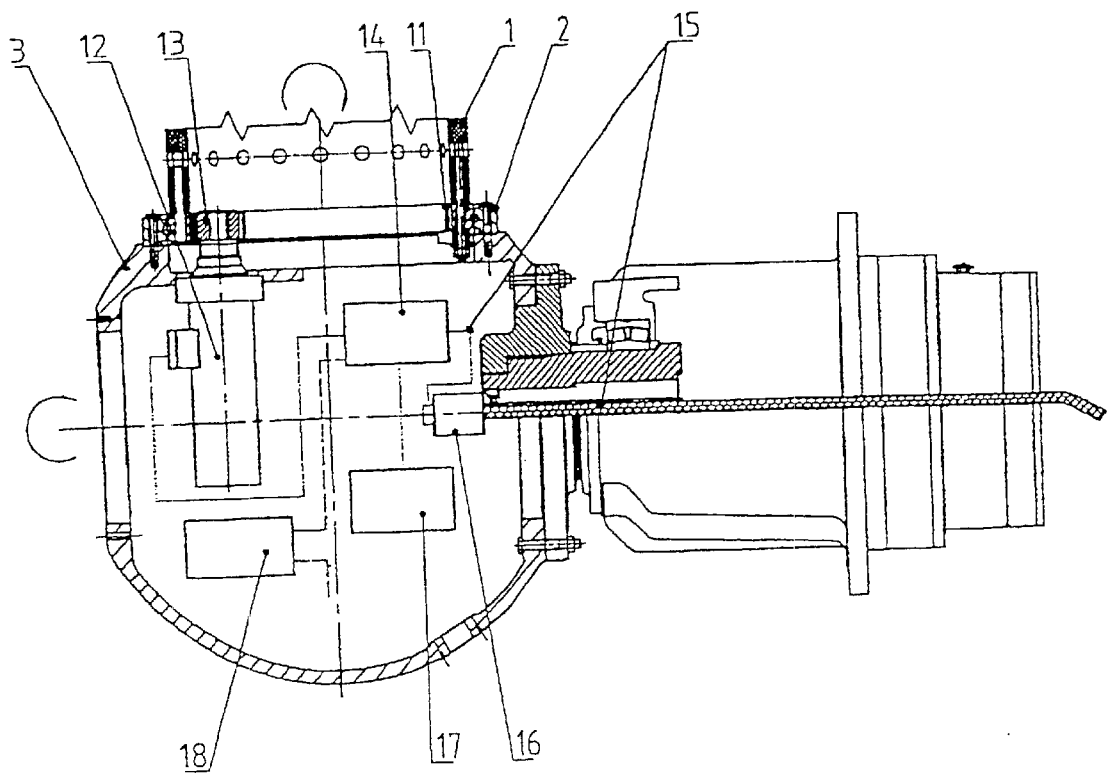
Figure 3:
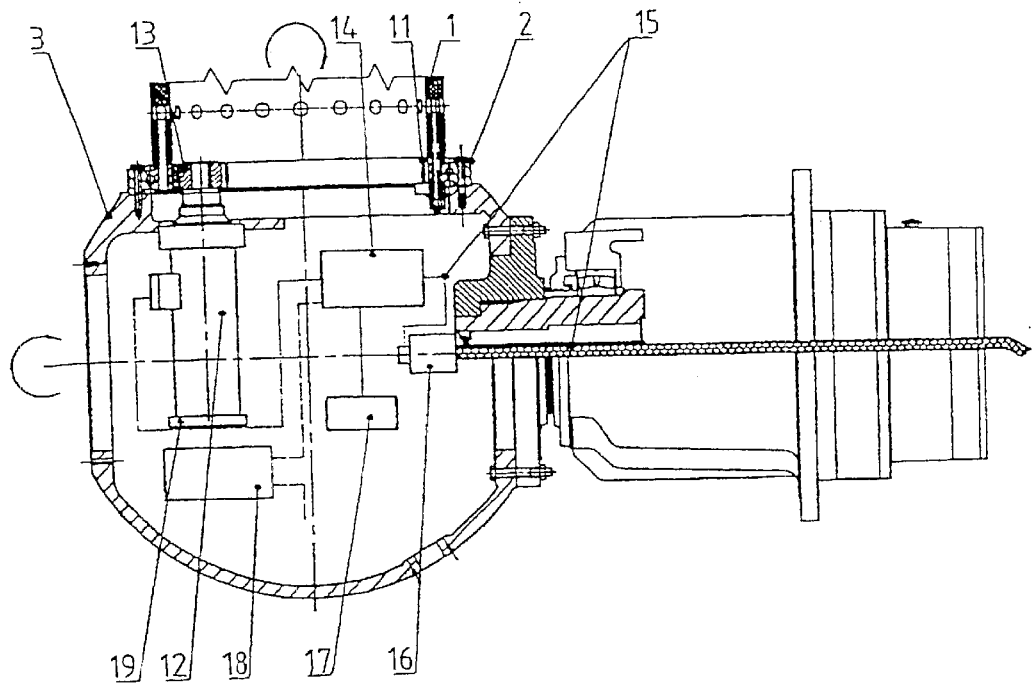
Figure 4:
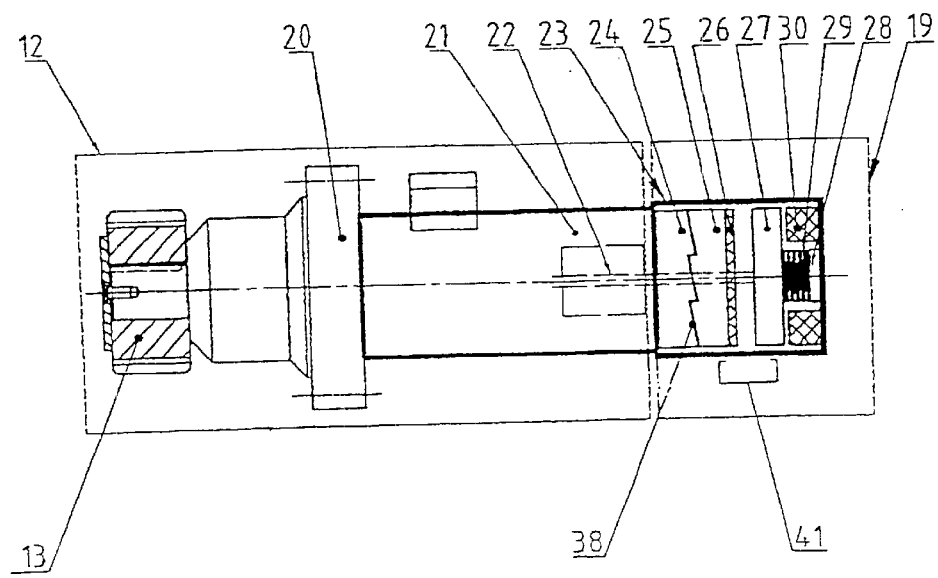
Figure 5:
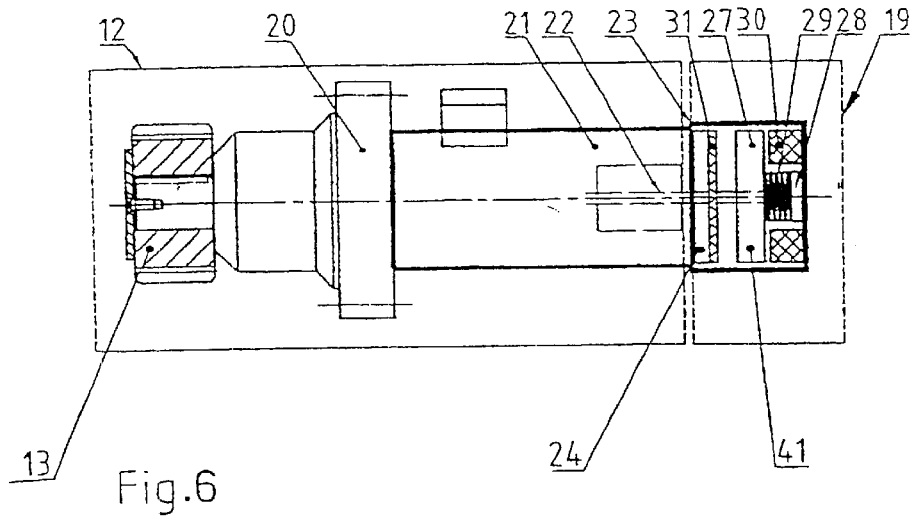
Figure 6:
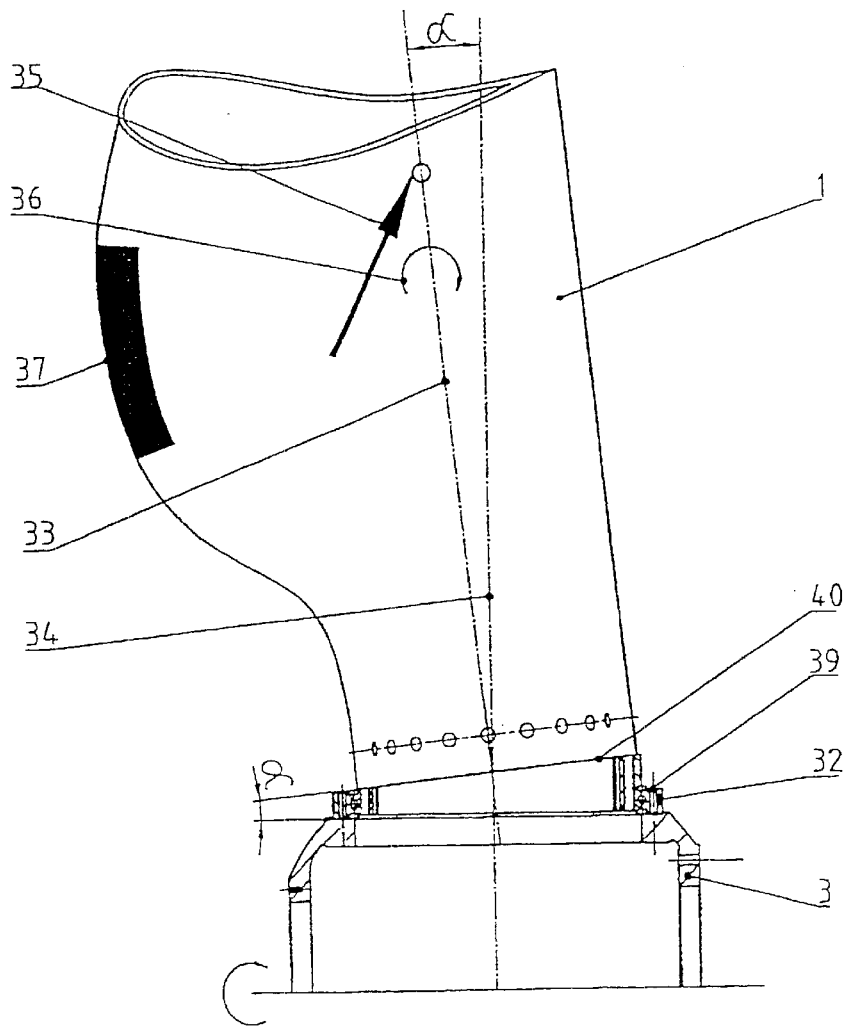

FIGS. 1 and 2 show two embodiments of rotor blade adjustment means as in the prior art, FIG. 3 shows one embodiment of rotor blade adjustment as claimed in this invention, FIG. 4 shows one embodiment of the backstop from FIG. 3, FIG. 5 shows another embodiment of the backstop from FIG. 3, and FIG. 6 shows one embodiment of rotor blade bearing and of a rotor blade in order to achieve an increased restoring moment of the rotor blades.

DESCRIPTION OF THE PREFERRED EMBODIMENTS

FIG. 1 shows the embodiment of rotor blade adjustment which is used most often in wind power plants. One rotor blade 1 is attached to an inner ring of a pivot bearing 2. For reasons of clarity only one rotor blade 1 is drawn. Conventionally however there is more than one rotor blade 1, generally three rotor blades 1. The outer ring of this pivot bearing 2 is screwed to a rotating rotor hub 3. By means of a mechanical rod 4 the linear motion of a connecting rod 5 is converted into rotary motion of the rotor blades 1. The connecting rod 5 which corotates with the rotor is supported in a rotor shaft 6 and gearing 7. A hydraulic cylinder 8 which does not turn delivers linear motion against the force of a spring 9 into the connecting rod 5, one thrust bearing 10 decoupling the rotating connecting rod 5 from the nonrotating components such as the spring 9 and the hydraulic cylinder 8 in the direction of rotation. When the power supply of the plant fails, the rotor blades 1 are turned by the spring 9 via the rods 4, 5 into the feathered position.

FIG. 2 shows another embodiment of rotor blade adjustment of the prior art. The rotor blade 1 is attached to pivot bearings 11 with internal toothing. The outer ring of this pivot bearing 11 is screwed to the rotating rotor hub 3. A geared motor 12 with a pinion 13 which turns the rotor blade 1 is assigned to each rotor blade 1. Each geared motor 12 is triggered via one converter 14 at a time. The power is supplied in normal operation for all drive units via a line 15 and a slipring 1. A control unit 18 ensures synchronism of the rotor blades 1. In the case of failure of this power supply each converter 14 is supplied separately from the emergency battery power supply 17, by which the rotor blades 1 can also be moved into the feathered position in this case.

FIG. 3 shows a first embodiment of a rotor blade adjustment as claimed in the invention. The rotor blade 1 is, as known, attached to a pivot bearing 2 with inner toothing 11. The outer ring of this pivot bearing 2 is screwed to the rotating rotor hub 3. By means of the geared motor 12 and the pinion 13 each rotor blade 1 (conventionally three rotor blades) is turned separately. Each geared motor 12 is triggered via one converter 14 at a time. Power is supplied for all drive units via a line 15 and the slipring 16. When this power supply fails, a lockout 19 which is connected to the geared motor 12 causes the rotor blades to be able to turn only in the direction of the feathered position.

FIG. 4 shows a first embodiment of the lockout 19 as claimed in the invention from FIG. 3, made as a backstop. The geared motor 12 has gearing 20, a stator 21 and a rotor with an elongated rotor shaft 22. The backstop 19 has a housing 23 which is permanently connected to the stator 21 and a bottom part 24 of a free wheel, the part being permanently connected likewise to the stator 21. The top part 41 of the free wheel has a coupling part 25 with a brake lining 26 on the side facing away from the bottom part 24. The coupling part 25 is freely turning and is supported to be able to move axially on the rotor shaft 22. The coupling part 25 and the bottom part 24 on the sides facing one another have a sawtooth-like profile 38 which allows mutual rotation in only one direction. The top part 41 furthermore has a brake disk 27 which is connected likewise with an axial displacement capacity but torsionally strong to the rotor shaft 22. The rotor shaft 22 has a plate-shaped end 28. One spring 29 is pretensioned under pressure between the plate-shaped end 28 and the brake disk 27. For rotor blade adjustment in normal operation the brake disk 27 is raised from the brake lining 26 by an electromagnet 30 against the force of the spring 29, by which the geared motor 12 can turn freely in both directions. It is also fundamentally conceivable for the brake disk 27 and the brake lining 26 to be omitted and the spring 29 to press on the coupling part 25 and for the coupling part 25 to be attracted directly by the electromagnet 30. The coupling part 25 must then of course be connected torsionally strong to the shaft 22.

When the power supply fails the electromagnet 30 is automatically deactivated, by which the brake disk 27 is pressed by the force of the spring 29 against the brake lining 26 so that the coupling part 25 of the free wheel is connected torsionally strong to the rotor shaft 22. By means of the sawtooth-like profile 38 of the coupling part 25 and of the bottom part 24 of the free wheel and by the displacement capacity of the coupling part 25 which is axial against the force of the spring 29, the rotor shaft 22 of the motor 12 and as a result of the rotor blade 1 can only continue to turn in the direction of the feathered position as far as a mechanical stop.

FIG. 5 shows another embodiment of the backstop from FIG. 3 as claimed in the invention. The geared motor 12 in turn has gearing 20, a stator 21, and a rotor with an elongated rotor shaft 22. The lockout 19 has a housing 23 which is permanently connected to the stator 21 and a bottom part 24 which is permanently connected likewise to the stator 21 and to which a brake lining 31 is attached. The brake disk 27 which forms the top part 41 of the lockout is likewise connected to the rotor shaft 22 with an axially displacement capacity and in a torsionally strong manner. The rotor shaft 22 has a plate-shaped end 28 and the spring 29 is pretensioned under pressure between the plate-shaped end 28 and the brake disk 27. In normal operation the electromagnet 30 lifts the brake disk 27 from the brake lining 26 against the force of the spring 29, by which the geared motor 12 can turn freely in both directions. In case of deactivation of the electromagnet 30 the brake disk 27 is pressed by the force of the spring 29 against the brake lining 31, with which it or the stator 21 is connected torsionally strong to the rotor shaft 22, by which the rotor shaft 22 is prevented from turning. The electromagnet 30 of the lockout of each individual geared motor 12 is supplied separately with power and is also individually activated by means of a control unit. When the power supply for the geared motors fails, during rotation of the rotor the electromagnet 30 is activated and thus the brake disk 27 is raised off the brake lining 31 only in the area in which the rotor blades, due to the combination of the external wind forces and inertial forces, move in the direction of the feathered position. This results in that the rotor blades move only in the direction of the feathered position and thus continuous braking of the rotor takes place. For power supply of the electromagnets 30 and the control, in this case there is an emergency power supply in the form of a battery 17 which in any case due to the relatively small power demand can be smaller than the battery 17 in the prior art in which the battery 17 must deliver energy for the active rotation of the rotor blades 1 into the feathered position and for holding of the rotor blades 1 in this position until complete standstill of the plant.

In one embodiment of the invention it can also be provided that one (provided anyway in the embodiment of FIG. 5) a battery 17 be used to turn the rotor blades 1 at least partially, for example by 10 to 20°, from the operating position in the direction of the feathered position in order to prevent braking as fast as possible or in strong wind gusts to prevent further acceleration of the rotor. At the same time, in the embodiment of FIG. 4 the backstop 19 is activated and prevents the rotor blades 1 from then turning back into the operating position. In the embodiment from FIG. 5, after this turning of the rotor blades 1 by preferably 10 to 20°, depending on whether the inertial forces cause turning into the feathered position or not, the lockout 19 is kept open or activated.

Instead of the described brake linings 26, 31 which are shown and which interact with a brake disk 27 of course also there can be form-fitted connection means such as for example claw couplings, by which the spring 29 and accordingly also the electromagnet 30 can be made weaker.

FIG. 6 shows embodiments of the rotor blade support and the rotor blade in the feathered position with which an increased restoring moment of the rotor blades 1 can be achieved. The rotor blade 1 is attached to a pivot bearing 32. The outer ring of this pivot bearing 32 is screwed to the turning rotor hub 3. The pivot bearing 32 has a screw-down surface for the rotor blades 1 which is slightly sloped relative to the screw-down surface to the rotor hub 3 (roughly 1 to 2°). Thus the pivot bearing 32 is likewise sloped by this angle α. This results in that the force vector 35 which results due to the outer wind forces attacks outside the axis 34 of rotation, by which additional torque 36 around the axis 34 of rotation acts in the direction of the feathered position.

Alternatively or additionally, on the end edge of the rotor blades 1 an additional weight 37 can be attached which also causes additional torque around the axis 34 of rotation which, depending on the position of the rotor blade 1 during one rotor revolution, causes turning in the direction of the working position or the feathered position. Since when the power supply fails the lockout allows only turning of the rotor blades 1 in the direction of the feathered position and blocks the opposite direction, these measures cause accelerated turning of the rotor blades 1 in the direction of the feathered position and thus accelerated braking of the rotor.

What is claimed is:

1. A device for adjustment of rotor blades (1) which are pivotally mounted on a rotor hub (3) of a wind power plant, with a drive for turning the rotor blades (1) and a lockout (19) which is connected to the rotor blades (1), wherein the lockout is an activatable lockout (19) which in the activated state prevents turning of the rotor blades (1) into the operating position, but allows turning of the rotor blades into the feathered position, and one lockout (19) is assigned to each rotor blade (1).

2. A device as claimed in claim 1, wherein the lockout (19) is a backstop which prevents turning of the rotor blade (1) into the operating position.

3. A device as claimed in claim 1, wherein the lockout (19) is assigned to the drive (12) for the rotor blade (1).

4. A device as claimed in claim 1, wherein the lockout (19) has a part (24) which is connected to the rotor hub (3) and a part (41) which is connected to the rotor blade (1), which parts are connected to one another to prevent turning of the rotor blade (1).

5. A device as claimed in claim 4, wherein the part (41) of the lockout (19) connected to the rotor blade (1) is connected torsionally strong to the rotor shaft (22) of the drive (12).

6. A device as claimed in claim 4, wherein the part (24) of the lockout (19) connected to the rotor hub (3) is permanently connected to the stator housing (21) and wherein the part (41) which is connected to the rotor blade (1) is supported to be able to move axially on the rotor shaft (22).

7. A device as claimed in claim 4, wherein the part (41) which is connected to the rotor blade (1) and the part (24) which is connected to the rotor hub (3) are connected to one another by form-fitting.

8. A device as claimed in claim 7, wherein on the sides of the part (41) which is connected to the rotor blade (1) and of the part (24) which is connected to the rotor hub (3), i.e. the sides assigned to one another, there is a roughly sawtooth-shaped profile (38) which are engaged to one another.

9. A device as claimed in claim 7, wherein the part (41) which is connected to the rotor blade (1) has a brake disk (27) which is connected torsionally strong to the rotor shaft (22) and has a coupling part (25) which has an essentially sawtooth-shaped profile (38) on the side facing the part (24) connected to the rotor hub (3) and has a brake lining (26) on the side facing the brake disk (27) and wherein the coupling part (25) is supported on the rotor shaft (22) to be able to turn and to move axially.

10. A device as claimed in claim 4, wherein the part (41) which is connected to the rotor blade (1) and the part (24) which is connected to the rotor hub (3) are connected to one another by frictional engagement.

11. A device as claimed claim 4, wherein there is a means (30) to detach the part (41) which is connected to the rotor blade (1) and the part (24, 31) which is connected to the rotor hub (3) from one another and wherein the part (41) which is connected to the rotor blade (1) are pressed by the force of a spring (29) continually in the direction to the part (24) which is connected to the rotor hub (3).

12. A device as claimed in claim 11, wherein the means (30) to detach the part (41) which is connected to the rotor blade (1) and the part (24, 31) which is connected to the rotor hub (3) from one another is an electromagnet.

13. A device as claimed in claim 12, wherein there is an emergency power supply (17) in the form of a battery which is intended for turning the rotor blades (1) into the feathered position and optionally for activating the electromagnet (30).

14. A device as claimed in claim 11, wherein the spring (29) on the one hand is supported on the part (41) which is connected to the rotor blade (1) and on the other hand on a projection (28) on a rotor shaft (22) of the drive (12).

15. A device as claimed in claim 4, wherein the part (41) which is connected to the rotor blade (1) has a brake disk (27).

16. A device as claimed in claim 15, wherein on the part (24) which is connected to the rotor hub (3) there is a brake lining (31) on the side facing the brake disk.

17. A device as claimed in claim 4, wherein the part (24) of the lockout (19) connected to the rotor hub 93) is permanently connected and wherein the part (41) which is connected to the rotor blade (1) is supported to be able to move axially on the rotor shaft (22).

18. A device for adjustment of rotor blades (1) which are pivotally mounted on a rotor hub (3) of a wind power plant, with a drive for turning the rotor blades (1) and a lockout (19) which is connected to the rotor blades (1), wherein the lockout is an activatable lockout (19) which in the activated state prevents turning of the rotor blades (1) into the operating position, but allows turning of the rotor blades into the feathered position, and the longitudinal axis (33) of the rotor blade (1) is sloped towards the axis of rotation (34) of the rotor blade (1).

19. A device as claimed in claim 18, wherein the rotor blade (1) is connected via a pivot bearing (32) to the rotor hub (3), the end face (39) of the outer ring of the pivot bearing (32) which is connected to the rotor hub (3) being sloped at an angle (a) to the end face (40) of the inner ring of the pivot bearing (32) which is connected to the rotor blade (1).

20. A device for adjustment of rotor blades (1) which are pivotally mounted on a rotor hub (3) of a wind power plant, with a drive for turning the rotor blades (1) and a lockout (19) which is connected to the rotor blades (1), wherein the lockout is an activatable lockout (19) which in the activated state prevents turning of the rotor blades (1) into the operating position, but allows turning of the rotor blades into the feathered position, and an additional weight (37) is attached to the rotor blade (1).

21. A device as claimed in claim 20, wherein the additional weight is added on an end edge of the rotor blade.

* * * * *